United States Patent
Wang

(10) Patent No.: US 10,740,889 B2
(45) Date of Patent: Aug. 11, 2020

(54) METHOD AND SYSTEM FOR DETECTION OF IN-PANEL MURA BASED ON HOUGH TRANSFORM AND GAUSSIAN FITTING

(71) Applicant: HUIZHOU CHINA STAR OPTOELECTRONICS TECHNOLOGY CO., LTD., Huizhou Guangdong (CN)

(72) Inventor: Yanxue Wang, Huizhou Guangdong (CN)

(73) Assignee: HUIZHOU CHINA STAR OPTOELECTRONICS TECHNOLOGY CO., LTD., Huizhou (CN)

( * ) Notice: Subject to any disclaimer, the term of this patent is extended or adjusted under 35 U.S.C. 154(b) by 171 days.

(21) Appl. No.: 15/974,382

(22) Filed: May 8, 2018

(65) Prior Publication Data
US 2019/0206043 A1    Jul. 4, 2019

Related U.S. Application Data

(63) Continuation of application No. PCT/CN2018/073057, filed on Jan. 17, 2018.

(30) Foreign Application Priority Data

Dec. 29, 2017    (CN) .......................... 2017 1 1479755

(51) Int. Cl.
*G06K 9/00* (2006.01)
*G06T 7/00* (2017.01)
(Continued)

(52) U.S. Cl.
CPC ............ *G06T 7/0004* (2013.01); *G06T 5/002* (2013.01); *G06T 5/40* (2013.01); *G06T 7/13* (2017.01);
(Continued)

(58) Field of Classification Search
USPC ......................................................... 382/141
See application file for complete search history.

(56) References Cited

U.S. PATENT DOCUMENTS

| | | | | |
|---|---|---|---|---|
| 2013/0044953 A1* | 2/2013 | Du | .......................... | H04N 1/403 382/170 |
| 2014/0088978 A1* | 3/2014 | Mundt | .................. | G10L 19/008 704/500 |
| 2016/0191159 A1* | 6/2016 | Aoyama | .............. | H04N 21/436 398/172 |

FOREIGN PATENT DOCUMENTS

| CN | 103413288 A | 11/2013 |
|---|---|---|
| CN | 103440654 A | 12/2013 |

(Continued)

*Primary Examiner* — Stephen P Coleman
(74) *Attorney, Agent, or Firm* — Hemisphere Law, PLLC; Zhigang Ma

(57) ABSTRACT

The present invention provides a method for detection of in-panel mura based on Hough transform and Gaussian function fitting, including: S1. acquiring an original gray-scale image; S2. acquiring a binarized image according to the gray-scale image; S3. performing an edge detection via Hough transform to crop edges of the gray-scale image; and S4. performing histogram statistics on the cropped gray-scale image, fitting the histogram to a Gaussian function, and detecting an in-panel mura result according to the fitting parameters. The present invention is able to determine images of the display region via Hough transform in order to acquire the region for in-panel mura detection, and also evaluate severity of in-panel mura via parameters acquired by Gaussian function fitting, and thus to quickly detecting in-panel mura.

16 Claims, 4 Drawing Sheets

(51) Int. Cl.
*G06T 7/13* (2017.01)
*G06T 5/00* (2006.01)
*G06T 7/136* (2017.01)
*G06T 5/40* (2006.01)

(52) U.S. Cl.
CPC .... *G06T 7/136* (2017.01); *G06T 2207/20132* (2013.01); *G06T 2207/30121* (2013.01)

(56) References Cited

FOREIGN PATENT DOCUMENTS

| | | |
|---|---|---|
| CN | 103869511 A | 4/2014 |
| CN | 103792699 A | 5/2014 |
| CN | 106650770 A | 5/2017 |
| CN | 107194919 A | 9/2017 |
| CN | 107316303 A | 11/2017 |
| KR | 20160054151 A | 6/2016 |
| WO | 2016/149877 A1 | 9/2016 |

* cited by examiner

METHOD AND SYSTEM FOR DETECTION OF IN-PANEL MURA BASED ON HOUGH TRANSFORM AND GAUSSIAN FITTING

RELATED APPLICATIONS

This application is a continuation application of PCT Patent Application No. PCT/CN2018/073057, filed Jan. 17, 2018, which claims the priority benefit of Chinese Patent Application No. 201711479755.4, filed Dec. 29, 2017, which is herein incorporated by reference in its entirety.

FIELD OF THE DISCLOSURE

The disclosure relates to a technical filed of image processing, especially to a method and a system for detection of in-panel mura based on Gaussian fitting and Hough transform.

BACKGROUND

Mura phenomenon is an in-panel defect of a display device (i.e. thin film transistor-liquid crystal display (TFT-LCD)) due to its manufacturing or driving process leading to non-uniformity in the surface of the panel, and can significantly affect visual effects of the display device. There are many types of mura, which includes various indications resulted by non-uniformity illuminance of a display device, and the in-panel mura usually happens in the central region of the display device. It is hard to detect in-panel mura due to low contrast and irregular shapes, and thus it affects results of in-panel mura test.

Therefore, to the above technical problems, it is necessary to provide a method and a system for detection of in-panel mura based on Gaussian fitting and Hough transform.

SUMMARY

A technical problem to be solved by the disclosure is to provide a method and a system for detection of in-panel mura based on Gaussian fitting and Hough transform.

To achieve the above purposes, an objective of the present invention is to provide a method for detection of in-panel mura based on Gaussian fitting and Hough transform, including: S1. acquiring an original gray-scale image; S2. acquiring a binarized image according to the gray-scale image; S3. performing an edge detection via Hough transform to crop edges of the gray-scale image; and S4. performing histogram statistics on the cropped gray-scale image, fitting the histogram to a Gaussian function, and detecting an in-panel mura result according to the fitting parameters.

To further improve the invention, before the step S2, the method further includes: performing a low-pass filtration on the gray-scale image to remove noises of the gray-scale image.

To further improve the invention, the step S2 is to perform polynomial fitting on a histogram of the gray-scale image and acquire a threshold cut-off point according to the minimum point of the fitting curve so as to obtain the binarized image.

To further improve the invention, the step S3 is to perform the edge detection via Hough transform, acquire a start point of a straight line of the binarized image, and determine a display region according to the start point and an amount of pixels in order to crop the edges of the gray-scale image.

In an embodiment, the Gaussian function is $fx=ae^{-(x-b)^2/c^2}$, and a, b, and c are free parameters; and "detecting an in-panel mura result according to the fitting parameters" in the step S4. is to: determine the in-panel mura result is slight if the detected parameter a is larger than or equal to a first default threshold value $a_0$ and the parameter c is smaller than or equal to a second default threshold value $c_0$, otherwise determine the in-panel mura result is severe.

Another objective of the present invention is to provide a system for detection of in-panel mura based on Gaussian fitting and Hough transform, which comprises: an image acquiring unit to acquire an original gray-scale image; an image processing unit to acquire an binarized image according to the gray-scale image; a Hough transform unit to perform an edge detection via Hough transform so as to crop edges of the gray-scale image; and an Gaussian fitting unit to perform histogram statistics on the cropped gray-scale image, fit the histogram to a Gaussian function, and detect an in-panel mura result according to the fitting parameters.

To further improve the invention, the system further includes a low-pass filtration unit, including a butterworth filter, to perform a low-pass filtration on the gray-scale image to remove noises of the gray-scale image.

To further improve the invention, the image processing unit can also perform polynomial fitting on a histogram of the gray-scale image and acquire a threshold cut-off point according to a the minimum point of the fitting curve in order to obtain the binarized image.

To further improve the invention, the Hough transform unit can also perform the edge detection via Hough transform, acquire a start point of a straight line of the binarized image, and determine a display region according to the start point and an amount of pixels in order to crop the edges of the gray-scale image.

To further improve the invention, the Gaussian fitting unit can also perform histogram statistics on the cropped gray-scale image and fit the histogram to a Gaussian function, wherein the Gaussian function is $fx=ae^{-(x-b)^2/c^2}$, and a, b, and c are free parameters, and the Gaussian fitting unit can also determine the in-panel mura result is slight if the detected parameter a is larger than or equal to a first default threshold value $a_0$ and the parameter c is smaller than or equal to a second default threshold value $c_0$, otherwise determine the in-panel mura result is severe.

The present invention is able to determine images of the display region via Hough transform in order to acquire the region for in-panel mura detection, and also evaluate severity of in-panel mura via parameters acquired by Gaussian function fitting, and thus to quickly detecting in-panel mura.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

In order to enable those skilled in the art to better understand the technical solutions in the present invention, the technical solution sin the embodiments of the present invention are clearly and completely described in the following with reference to the accompanying drawings. Apparently, the described embodiments are only a part but not all of the embodiments of the present invention. All other embodiments obtained by an ordinary skilled person in the art based on the embodiment of the present application without creative efforts shall fall within the protection scope of the present invention.

Figure 1:
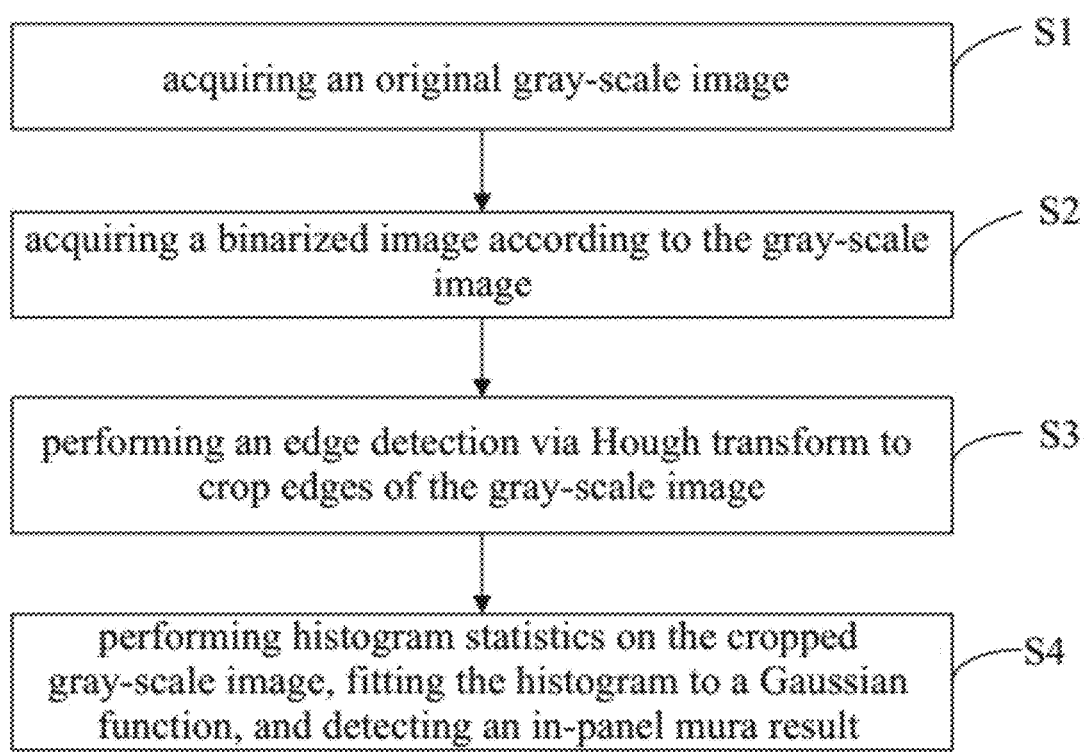
FIG. 1 is a flowchart of a method for detection of in-panel mura according to the present invention.
Figure 2:
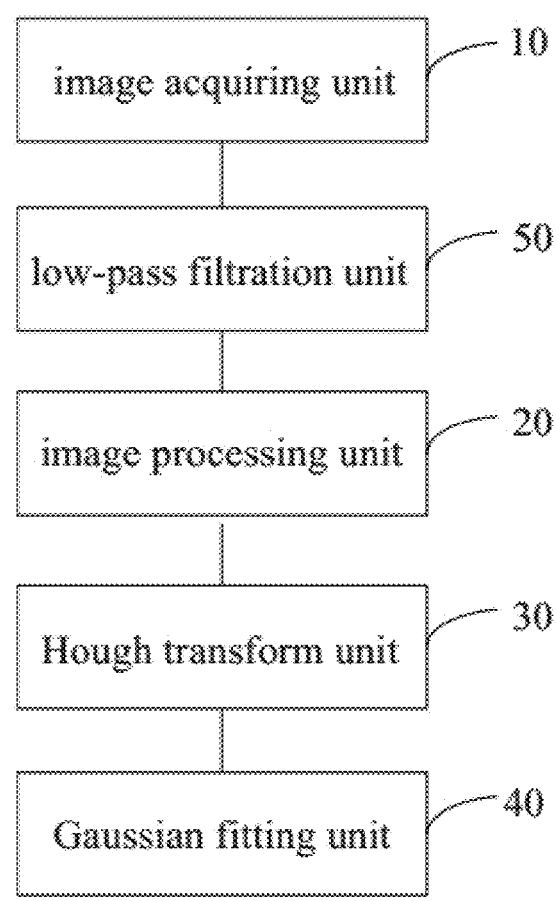
FIG. 2 is a module schematic of a system for detection of in-panel mura according to the present invention.

As shown in FIG. 1, the present invention provides a method for detection of in-panel mura based on Hough transform and Gaussian fitting, which includes: S1. acquiring an original gray-scale image; S2. acquiring a binarized image according to the gray-scale image; S3, performing an edge detection via Hough transform to crop edges of the gray-scale image; and S4. performing histogram statistics on the cropped gray-scale image, fitting the histogram to a Gaussian function, and detecting an in-panel mura result according to the fitting parameters.

In an embodiment of the present invention, the method before the step S2 further comprises: performing a low-pass filtration on the gray-scale image to remove noises of the gray-scale image.

It is unavoidable that there are noises in the gray-scale image due to the electronic photographic camera when it is taken in a darkroom. A butterworth filter is used according to characteristics of the noises to perform a low-pass filtration.

Specifically, the step S2 is to perform polynomial fitting on a histogram of the gray-scale image and acquire a threshold cut-off point according to the minimum point of the fitting curve in order to acquire the binarized image.

Because the camera may catch unwanted screen other than the display device, it is needed to automatic detect the display region out to preclude influences of non-display regions of the image to the calculation. It is to perform polynomial fitting on the histogram of the gray-scale image, and acquire a threshold cut-off point according to the minimum point of the fitting curve. Gray-scale values larger than the threshold cut-off point are set as 255, and gray-scale values smaller than the threshold cut-off point are set as 0 in order to obtain the binarized image. The binarized image demonstrates a visual effect of clear black and white.

In the step S3, it is to perform the edge detection via Hough transform, acquire a start point of a straight line of the binarized image, and determine a display region according to the start point and an amount of pixels in order to crop the edges of the gray-scale image.

Because of low probability of in-panel mura occurred in the marginal portion of the display device and less impact on human visual perception, for the purpose of fast calculation, the edges of the image are cropped off in the process leaving central large portion of the displaying image.

In the step S4, the Gaussian function $fx=ae^{-(x-b)^2/c^2}$, and a, b, and c are free parameters; and specifically "detecting an in-panel mura result according to the fitting parameters" is to determine the in-panel mura result is slight if the detected parameter a is larger than or equal to a first default threshold value $a_0$ and the parameter c is smaller than or equal to a second default threshold value $c_0$, otherwise determine the in-panel mura result is severe.

As to perform histogram statistics on the cropped gray-scale image, distribution of the histogram appears more concentrated and peaks are high if the in-panel mura result is slight; and distribution of the histogram appears more dispersed and peaks are lower. In the present invention, the histogram is subjected to the Gaussian function, and the in-panel mura is described using the fitting parameters a and c.

Figure 4:
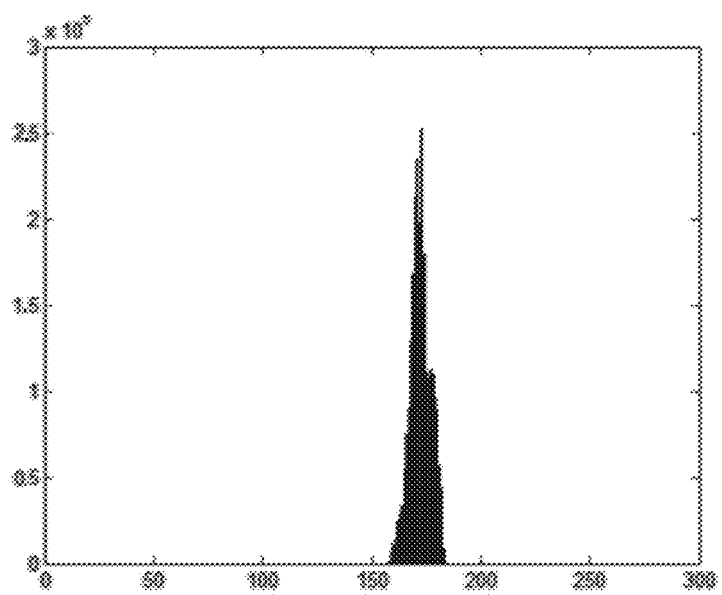
FIG. 4 is the histogram of the cropped gray-scale image of the embodiment 1.

As shown in FIG. 4, the present invention also provides a system for detection of in-panel mura based on Gaussian function fitting and Hough transform, which includes: an image acquiring unit 10 to acquire an original gray-scale image; an image processing unit 20 to acquire a binarized image according to the gray-scale image; a Hough transform unit 30 to perform an edge detection via Hough transform so as to crop edges of the gray-scale image; and an Gaussian fitting unit 40 to perform histogram statistics on the cropped gray-scale image, fit the histogram to a Gaussian function, and detect an in-panel mura result according to the fitting parameters.

Moreover, the system of the present invention further comprises: a low-pass filtration unit 50, which may be a butterworth filter, to perform a low-pass filtration on the gray-scale image to remove noises of the gray-scale image.

The following description in conjunction with specific embodiments of the present invention is provided to further illustrate the present invention.

Embodiment 1

Figure 3:
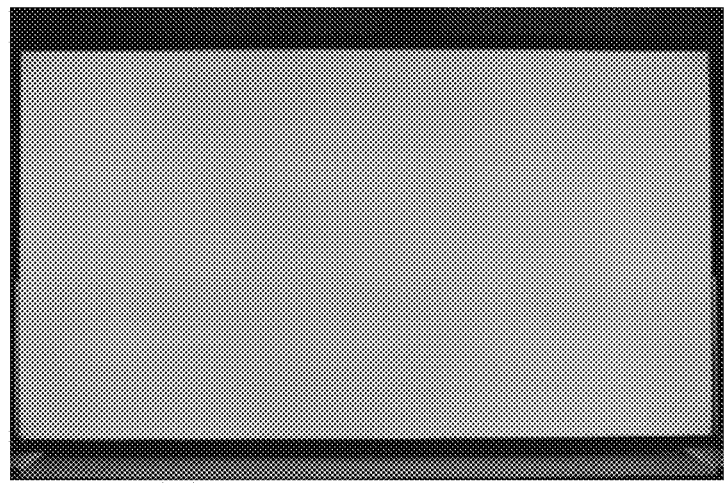
FIG. 3 is the gray-scale image acquired in an embodiment 1 of the present invention.

The in-panel mura detecting method of the embodiment includes: acquiring the gray-scale image as shown in FIG. 3; performing a low-pass filtration on the gray-scale image to remove noises of the gray-scale image; performing polynomial fitting on the histogram of the gray-scale image; and acquiring a threshold cut-off point according to the minimum point of the fitting curve so as to obtain a binarized image; performing the edge detection via Hough transform; acquiring the start point of a straight line; and determining the display region according to the start point and an amount of pixels in order to crop edges of the gray-scale image; and performing histogram statistics on the cropped gray-scale image, fitting the histogram to a Gaussian function, and detecting an in-panel mura result according to the fitting parameters, wherein the Gaussian function is $fx=ae^{-(x-b)^2/c^2}$, and a, b, and c are free parameters.

The histogram of the cropped gray-scale image of the embodiment is as shown in FIG. 4, and the Gaussian function in accordance with distribution of the histogram is obtained that a=2.08e+05, c=6.559 and $R^2$=0.964, wherein $R^2$ represents how the histogram and the Gaussian fitting curve match. Closer the value is to 1, the higher the match is. Apparently, the histogram of the embodiment is highly matched with the Gaussian fitting curve.

It is determined the embodiment has slight in-panel mura result as the parameter a=2.08e+05 is larger than the first default threshold value $a_0$ (for example, 1.5e+05), and the parameter c=6.559 is smaller than the second default threshold value $c_0$ (for example, 8).

The first default threshold value $a_0$ and the second default threshold value $c_0$ are irrelevant to conditions and specification of the display device. The threshold value described in the present embodiment is only for illustration, and they can be set as other values in other embodiments.

Embodiment 2

Figure 5:
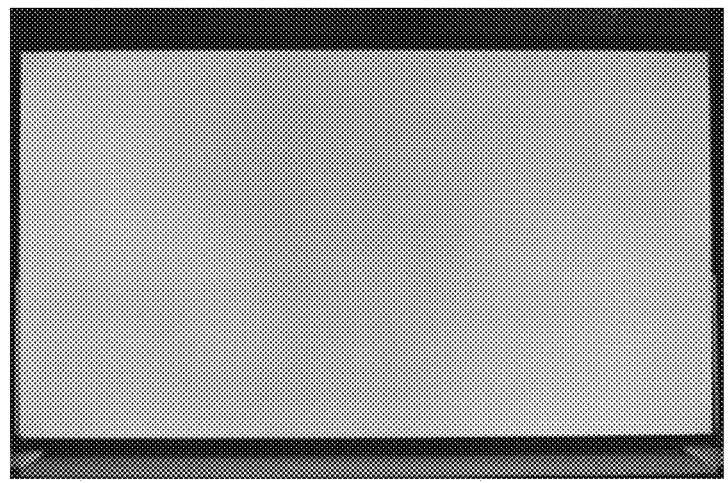
FIG. 5 is the gray-scale image acquired in an embodiment 2 of the present invention.

The in-panel mura detecting method of this embodiment includes: acquiring the gray-scale image as shown in FIG. 5; performing the low-pass filtration on the gray-scale image to remove noises of the gray-scale image; performing polynomial fitting on the histogram of the gray-scale image, and acquiring a threshold cut-off point according to the minimum point of the fitting curve so as to obtain a binarized image; performing the edge detection via Hough transform, acquiring the start point of a straight line of the binarized image; and determining the display region according to the start point and an amount of pixels in order to crop edges of the gray-scale image; and performing histogram statistics on the cropped gray-scale image; fitting the histogram to a Gaussian function, and detecting an in-panel mura result according to the fitting parameters, wherein the Gaussian function is $fx=ae^{-(x-b)^2/c^2}$, and a, b, and c are free parameters.

Figure 6:
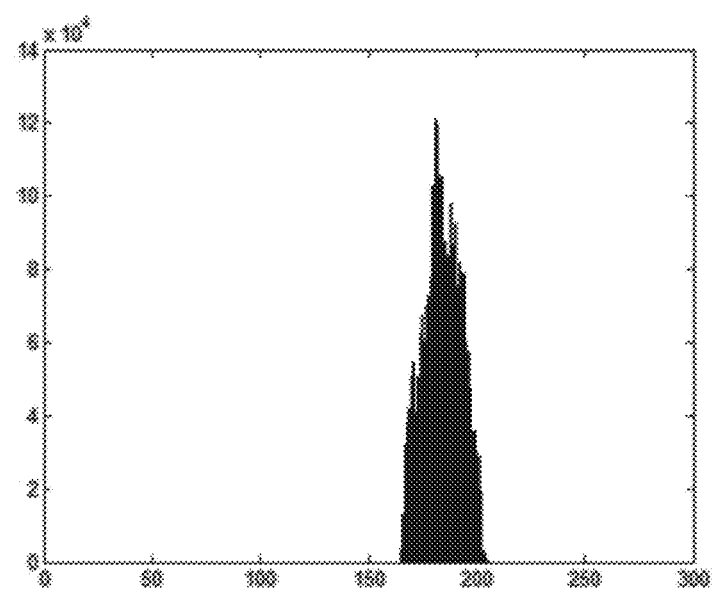
FIG. 6 is the histogram of the cropped gray-scale image of the embodiment 2.

The histogram of the cropped gray-scale image of the embodiment is as shown in FIG. 6, and the Gaussian function in accordance with distribution of the histogram is obtained that $a=1.07e+05$, $c=13.83$, $R^2=0.967$, wherein $R^2$ represents how the histogram and the Gaussian fitting curve match. Closer the value is to 1, the higher the match is. Apparently, the histogram of the embodiment is highly matched with the Gaussian fitting curve.

It is determined the embodiment has severe in-panel mura result as the parameter $a=1.07e+05$ is smaller than the first default threshold value $a_0$ (for example, 1.5e+05), and the parameter $c=13.83$ is smaller than the second default threshold value $c_0$ (for example, 8).

The first default threshold value $a_0$ and the second default threshold value $c_0$ are irrelevant to conditions and specification of the display device. The threshold value described in the present embodiment is only for illustration, and they can be set as other values in other embodiments.

The present invention also provides an electronic equipment. The electronic equipment includes at least a processor and a storage connecting with the at least one processor. The storage is to store instructions that can be executed by the at least one processor. The instructions is executed by the at least one processor to carry out the in-panel mura detecting method as illustrated in the above embodiments by the at least one processor.

The present invention also provides a non-transitory storage medium, which stores computer-executable instructions, and the computer-executable instructions provide to execute the above illustrated in-panel mum detecting method.

The present invention also provides a computer program product, including a computer program stored in a non-transitory computer-readable medium. The computer program includes program instructions, and the computer executes the above illustrated in-panel mura detecting method when the program instructions are executed by the computer.

The system for detection of in-panel mura provided by the present invention can execute the in-panel detecting method provided in every and any embodiments of the present invention and possesses corresponding functional module and beneficial effects of the detecting method. Technical details of the system can refer to embodiments of the in-panel mura detecting method as illustrated above and are omitted herein.

As can be seen from the above embodiments, the present invention is to determine the display region by Hough transform so as to obtain the in-panel mura detecting region. And via the parameters acquired by Gaussian function fitting to determine a result of in-panel mura, and thus a fast in-panel mura detection can be achieved.

Any process or method illustrated in the flowchart or otherwise described in this description may be understood as representing the code comprises one or more steps for implementing specific logical functions or processes executable instructions, module, fragment or portion. And an ordinary skilled person in the art should understand present invention includes additional implementations in which the order shown or discussed can be not followed. The invention can be achieved by performing the steps in a substantially simultaneous manner or in reverse order depending upon functions involved therein, and it is still within the scope of application of the present invention.

A logical and/or steps described herein flowcharts or in other ways, for example, may be considered as a executable instructions sequencing table for implementing logical functions, which can be embodied in any computer-readable medium to be used in an instruction execution system, apparatus, or device (e.g., computer-based system, processor-containing system, or other system may be performed from instruction fetch apparatus, or device), or to be used in a combination of these instruction execution system, or equipment. As this specification, a "computer-readable medium" can be any means that may include, store, communicate, propagate, or transport the program for an instruction execution system, apparatus, or device, or other apparatus in combination with an instruction execution system, apparatus, or device to be used. More specific examples (a non-exhaustive list) of the computer-readable medium including: an electrical connection (electronic device) having one or more wires, a portable computer diskette cartridge (magnetic device), a random access memory (RAM), a read only memory (ROM), erasable edit read-only memory (EPROM or flash memory), an optical fiber device, and a portable compact disc read-only memory (CAROM). Further, the computer-readable medium could even be paper or another suitable medium upon which the program is printed, as can, for example paper or other medium by optical scanning, and then edited, if necessary, interpreted, or otherwise suitable to be processed using the program obtained electronically, and then stored in a computer memory.

It should be understood that various portions of the present invention may be implemented in hardware, software, firmware or a combination thereof to achieve. In the above-described embodiments, a plurality of steps or methods may be implemented in software or firmware and executed by a suitable system executing instructions stored in a memory. For example, if implemented in hardware, as in another embodiment, the present technique may be any one of the following well-known in the art, or their combination thereof: a logic gate circuit for implementing logic functions upon data signals discrete logic circuits having appropriate combinational logic gate circuit ASIC, a programmable gate array (PGA), a field programmable gate array (FPGA) and the like.

An ordinary skilled person in the art may understand that the above-described embodiments of the method that all or part of the steps may be achieved by a program instructing relevant hardware, the program may be stored in a computer-readable storage medium, and execution of the program may include a step of method embodiments or a combination thereof. Further, the functional units in various embodiments of the present invention may be integrated in one processing module, or may be physically separate units, or may be two or more units integrated in a module. The integrated module may be implemented in the form of hardware, or the form of software with functional modules. If the integrated module is implemented as an independent product sold or used in the form of a software functional module, it may be stored in a computer-readable storage medium.

The storage medium may be a read-only memory, magnetic or optical disk. Although the above embodiments of the present invention has been illustrated and described, it is understood that the above embodiments are exemplary and are not to be construed as limiting the present invention. Deductions, modifications, substitutions or variations can be made by one having ordinary skills in the art and should be included in the protection scope of the application.

To those skilled in the art, the invention is not limited to the details of the above-described exemplary embodiment, but without departing from the spirit or essential characteristics of the present invention, the present invention can be realized in other specific forms. Therefore, no matter from what point of view, the embodiments should be considered exemplary, and not limiting. The scope of the invention is indicated by the appended claims rather than by the foregoing description, and the appended claims therefore intend to include all changes which come within the meaning and range of equivalents thereof within the protection of the application. Any reference numerals in the claims should not be considered as to limitation to the corresponding claims.

Further, it should be understood that while the present specification be described in terms of embodiments, but not every embodiment contains only a separate technical aspect. This narrative description only for the sake of clarity, and those skilled in the art should see the specification as a whole, and the technical solutions in the respective embodiments may be suitably combined to form other embodiments that can be appreciated by an ordinary skilled person in the art.

What is claimed is:

1. A method for detection of in-panel mura based on Gaussian fitting and Hough transform, comprising:
    S1, acquiring an original gray-scale image;
    S2, acquiring a binarized image according to the gray-scale image;
    S3, performing an edge detection via Hough transform to crop edges of the gray-scale image according to a start point of a straight line of the binarized image; and
    S4, performing histogram statistics on the cropped gray-scale image, fitting the histogram to a Gaussian function, and detecting an in-panel mura result according to the fitting parameters.

2. The method according to claim 1, wherein the step S2 is to perform polynomial fitting on a histogram of the gray-scale image and acquire a threshold cut-off point according to a minimum point of the fitting curve in order to acquire the binarized image.

3. The method according to claim 1, wherein the step S3 is to perform the edge detection via Hough transform, acquire the start point of the straight line of the binarized image, and determine a display region according to the start point and an amount of pixels in order to crop the edges of the gray-scale image.

4. The method according to claim 3, wherein
    the Gaussian function is $fx=ae^{-(x-b)^2/c^2}$, and a, b, and c are free parameters; and
    "detecting an in-panel mura result according to the fitting parameters" in the step S4 is to: determine the in-panel mura result is slight if the detected parameter a is larger than or equal to a first default threshold value $a_0$ and the parameter c is smaller than or equal to a second default threshold value $c_0$, otherwise determine the in-panel mura result is severe.

5. The method according to claim 1, before the step S2, further comprising:
    performing a low-pass filtration on the gray-scale image to remove noises of the gray-scale image.

6. The method according to claim 5, wherein the step S2 is to perform polynomial fitting on a histogram of the gray-scale image and acquire a threshold cut-off point according to a minimum point of the fitting curve in order to acquire the binarized image.

7. The method according to claim 6, wherein the step S3 is to perform the edge detection via Hough transform, acquire a start point of a straight line of the binarized image, and determine a display region according to the start point and an amount of pixels in order to crop the edges of the gray-scale image.

8. The method according to claim 7, wherein
    the Gaussian function is $fx=ae^{-(x-b)^2/c^2}$, and a, b, and c are free parameters; and
    "detecting an in-panel mura result according to the fitting parameters" in the step S4. is to: determine the in-panel mura result is slight if the detected parameter a is larger than or equal to a first default threshold value $a_0$ and the parameter c is smaller than or equal to a second default threshold value $c_0$, otherwise determine the in-panel mura result is severe.

9. A method for detection of in-panel mura based on Gaussian fitting and Hough transform, comprising:
    S1. acquiring an original gray-scale image;
    S2. acquiring a binarized image according to the gray-scale image by performing polynomial fitting on a histogram of the gray-scale image and acquiring a threshold cut-off point according to a minimum point of the fitting curve so as to obtain the binarized image;
    S3. performing an edge detection via Hough transform to crop edges of the gray-scale image according to a start point of a straight line of the binarized image; and
    S4. performing histogram statistics on the cropped gray-scale image, fitting the histogram to a Gaussian function, and detecting an in-panel mura result according to the fitting parameters;
    wherein before the step S2, the method further comprises:
    performing a low-pass filtration on the gray-scale image to remove noises of the gray-scale image.

10. A system for detection of in-panel mura based on Hough transform and Gaussian fitting, comprising:
    an image acquiring unit to acquire an original gray-scale image;
    an image processing unit to acquire a binarized image according to the gray-scale image;
    a Hough transform unit to perform an edge detection via Hough transform so as to crop edges of the gray-scale image according to a start point of a straight line of the binarized image; and
    an Gaussian fitting unit to perform histogram statistics on the cropped gray-scale image, fit the histogram to a Gaussian function, and detect an in-panel mura result according to the fitting parameters.

11. The system according to claim 10, further comprising:
a low-pass filtration unit, including a butterworth filter, to perform a low-pass filtration on the gray-scale image to remove noises of the gray-scale image.

12. The system according to claim 10, wherein the Hough transform unit is to perform the edge detection via Hough transform, acquire the start point of the straight line of the binarized image, and determine a display region according to the start point and an amount of pixels in order to crop the edges of the gray-scale image.

13. The system according to claim 12, wherein the Gaussian function is $fx=ae^{-(x-b)^2/c^2}$, and a, b, and c are free parameters; and the Gaussian fitting unit is to perform histogram statistics on the cropped gray-scale image, perform the Gaussian function on the histogram, and determine the in-panel mura result is slight if the detected parameter a is larger than or equal to a first default threshold value $a_0$ and the parameter c is smaller than or equal to a second default threshold value $c_0$, otherwise determine the in-panel mura result is severe.

14. The system according to claim 10, wherein the image processing unit is to perform polynomial fitting on a histogram of the gray-scale image and acquire a threshold cut-off point according to a minimum point of the fitting curve in order to obtain the binarized image.

15. The system according to claim 14, wherein the Hough transform unit is to perform the edge detection via Hough transform, acquire the start point of the straight line of the binarized image, and determine a display region according to the start point and an amount of pixels in order to crop the edges of the gray-scale image.

16. The system according to claim 15, wherein the Gaussian function is $fx=ae^{-(x-b)^2/c^2}$, and a, b, and c are free parameters; and the Gaussian fitting unit is to perform histogram statistics on the cropped gray-scale image, perform the Gaussian function on the histogram, and determine the in-panel mura result is slight if the detected parameter a is larger than or equal to a first default threshold value $a_0$ and the parameter c is smaller than or equal to a second default threshold value $c_0$, otherwise determine the in-panel mura result is severe.

* * * * *